United States Patent
Sheridan et al.

(10) Patent No.: US 9,970,352 B2
(45) Date of Patent: May 15, 2018

(54) TURBOMACHINE FAN CLUTCH

(75) Inventors: William G. Sheridan, Southington, CT (US); Michael E. McCune, Colchester, CT (US)

(73) Assignee: United Technologies Corporation, Farmington, CT (US)

(*) Notice: Subject to any disclaimer, the term of this patent is extended or adjusted under 35 U.S.C. 154(b) by 1098 days.

(21) Appl. No.: 13/359,552

(22) Filed: Jan. 27, 2012

(65) Prior Publication Data
US 2013/0195603 A1   Aug. 1, 2013

(51) Int. Cl.
*F02C 3/107* (2006.01)
*F02C 7/36* (2006.01)
*F04D 25/02* (2006.01)

(52) U.S. Cl.
CPC ............ *F02C 3/107* (2013.01); *F02C 7/36* (2013.01); *F04D 25/02* (2013.01); *F05D 2260/4023* (2013.01)

(58) Field of Classification Search
CPC .......... F16D 43/02; F16D 43/04; F16D 43/06; F02C 3/107; F02C 7/36; F04D 25/02; F05D 2260/4023
USPC ............................................................ 416/1
See application file for complete search history.

(56) References Cited

U.S. PATENT DOCUMENTS

| | | | |
|---|---|---|---|
| 1,635,966 A * | 7/1927 | Stanton | 416/164 |
| 2,804,748 A | 9/1957 | Hutchinson | |
| 2,951,540 A | 9/1960 | Hawkins | |
| 3,187,869 A | 6/1965 | Spencer | |
| 3,227,176 A | 1/1966 | Luebering et al. | |
| 3,287,906 A | 11/1966 | McCormick | |
| 3,779,665 A | 12/1973 | Taten, Jr. et al. | |
| 4,047,842 A * | 9/1977 | Avena et al. | 416/152 |
| 4,474,531 A | 10/1984 | Weiss | |
| 4,531,620 A | 7/1985 | Stone | |
| 4,732,535 A * | 3/1988 | Tubbs | 415/144 |
| 5,029,439 A | 7/1991 | Berneuil et al. | |
| 5,915,917 A | 6/1999 | Eveker et al. | |
| 6,079,200 A | 6/2000 | Tubbs | |
| 6,312,215 B1 | 11/2001 | Walker | |
| 6,638,006 B2 | 10/2003 | Selby | |

(Continued)

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

International Preliminary Report on Patentability for PCT Application No. PCT/US2013/021690 dated Aug. 7, 2014.

(Continued)

*Primary Examiner* — Woody Lee, Jr.
*Assistant Examiner* — Brian O Peters
(74) *Attorney, Agent, or Firm* — Carlson, Gaskey & Olds, P.C.

(57) ABSTRACT

An exemplary turbomachine clutch assembly includes a clutch that moves from a first position to a second position in response to rotation of a turbomachine fan at a speed greater than a threshold speed. The clutch permits rotation of the turbomachine fan in a first direction whether the clutch is in the first position or the second position. The clutch limits rotation of the turbomachine fan in an opposite, second direction when the clutch is in the first position.

21 Claims, 4 Drawing Sheets

(56) References Cited

U.S. PATENT DOCUMENTS

| | | |
|---|---|---|
| 7,849,668 B2 | 12/2010 | Sheridan |
| 2007/0289310 A1 | 12/2007 | Dooley et al. |
| 2009/0208334 A1 | 8/2009 | Vettese et al. |
| 2010/0029457 A1 | 2/2010 | Carr |
| 2010/0148396 A1 | 6/2010 | Xie et al. |
| 2010/0212281 A1 | 8/2010 | Sheridan |
| 2010/0331139 A1 | 12/2010 | McCune |

OTHER PUBLICATIONS

International Search Report and Written Opinion dated Mar. 19, 2013 for International Application No. PCT/US2013/021690.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacuturing, stuctures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Pres. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

* cited by examiner

TURBOMACHINE FAN CLUTCH

BACKGROUND

This disclosure relates to a clutch and, more particularly, to a mechanical clutch that limits relatively high-speed, unlubricated turbomachine fan operation.

Turbomachines, such as gas turbine engines, typically include a fan, a turbine section, a compressor section, and a combustor section. Turbomachines may employ a geared architecture connecting the fan and the turbine section.

Air moving through a non-operating gas turbine engine may rotate (i.e., windmill) the fan of the gas turbine engine. In some examples, the gas turbine engine is one of a group of engines that propels an aircraft during flight, and windmilling occurs if the gas turbine engine shuts down during flight. In other examples, wind moving though a gas turbine engine parked on the ground causes windmilling. Gas turbine engines include complex systems that lubricate the fan when windmilling.

SUMMARY

A turbomachine clutch assembly according to an example embodiment of the present disclosure includes, among other things, a clutch that moves from a first position to a second position in response to rotation of a turbomachine fan at a speed greater than a threshold speed. The clutch permits rotation of the turbomachine fan in a first direction whether the clutch is in the first position or the second position. The clutch limits rotation of the turbomachine fan in an opposite, second direction when the clutch is in the first position.

In a further non-limiting embodiment of the foregoing turbomachine clutch assembly, the turbomachine fan is a ducted fan.

In a further non-limiting embodiment of either of the foregoing turbomachine clutch assemblies, the threshold speed is less than an idling speed.

In a further non-limiting embodiment of any of foregoing turbomachine clutch assemblies, the threshold speed is a threshold rotational speed of the fan.

In a further non-limiting embodiment of any of foregoing turbomachine clutch assemblies, the clutch is an entirely mechanical clutch.

In a further non-limiting embodiment of any of foregoing turbomachine clutch assemblies, the clutch moves from the second position to the first position in response to rotation of a turbomachine no longer exceeding the threshold speed.

In a further non-limiting embodiment of any of foregoing turbomachine clutch assemblies, the clutch assembly may include a lubrication system that lubricates the turbomachine fan. The lubrication system is powered by the turbomachine fan rotating in the first direction.

In a further non-limiting embodiment of any of the foregoing turbomachine clutch assemblies, the clutch permits rotation of the turbomachine fan in the second direction when the clutch is in the second position.

In a further non-limiting embodiment of any of foregoing turbomachine clutch assemblies, the turbomachine fan is in a turbomachine that rotates the turbomachine fan in the first direction during operation.

A mechanical clutch assembly for a turbomachine according to another example embodiment of the present disclosure includes, among other things, a fan and a clutch moveable between a first position that limits windmilling rotations of the fan and a second position that prevents windmilling rotations of the fan in one direction. The clutch is a mechanical clutch.

In a further non-limiting embodiment of the foregoing mechanical clutch assembly, the clutch includes a counterweight system that changes positions in response to centrifugal force, the counterweight system moving the clutch from the first position to the second position when the counterweight system changes positions.

In a further non-limiting embodiment of either of the foregoing mechanical clutch assemblies, the counterweight system is biased toward positioning the clutch in the first position.

In a further non-limiting embodiment of any of the foregoing mechanical clutch assemblies, the assembly includes a spring that biases the counterweight system.

In a further non-limiting embodiment of any of the foregoing mechanical clutch assemblies, the counterweight system changing positions initiates movement of radial movement of rollers in the clutch.

In a further non-limiting embodiment of any of the foregoing mechanical clutch assemblies, the clutch is a ramp/roller clutch.

A method of controlling rotation of a turbomachine fan according to an exemplary aspect of the present disclosure includes, among other things, engaging a clutch to prevent rotation of a turbomachine fan in a first direction when a rotational speed of the turbomachine fan is below a threshold speed, and disengaging the clutch when the rotational speed of the turbomachine fan meets or exceeds the threshold speed.

In a further non-limiting of the foregoing method, the engaging and disengaging is entirely mechanical.

In a further non-limiting embodiment of either of the foregoing methods, the method uses centrifugal weights to control the engaging and the disengaging.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
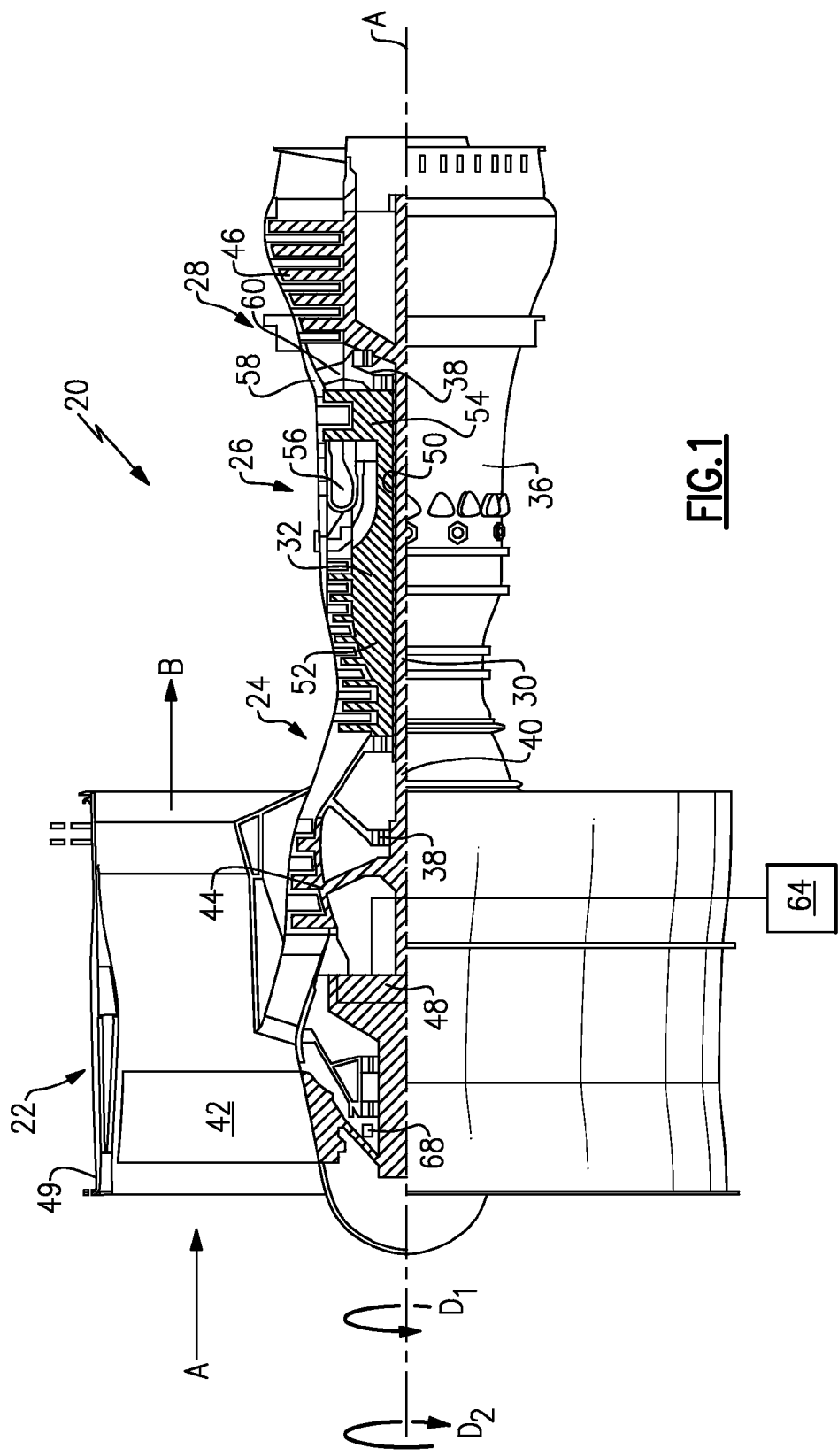
FIG. 1 shows a partial section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28. Other examples may include an augmentor section (not shown) among other systems or features.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

In the example engine 20, the fan section 22 drives air along a bypass flowpath while the compressor section 24 drives air along a core flowpath. Compressed air from the compressor section 24 communicates through the combustion section 26. The products of combustion expand through the turbine section 28.

The example engine 20 generally includes a low-speed spool 30 and a high-speed spool 32 mounted for rotation about an engine central longitudinal axis A relative to an engine static structure 36. The low-speed spool 30 and the high-speed spool 32 are rotatably supported by several bearing systems 38. It should be understood that various bearing systems 38 at various locations may alternatively, or additionally, be provided.

The low-speed spool 30 generally includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30.

The example fan 42 is considered a ducted fan as the fan 42 is within a duct 49.

The high-speed spool 32 includes an outer shaft 50 that interconnects a high-pressure compressor 52 and high-pressure turbine 54.

The combustion section 26 includes a circumferentially distributed array of combustors 56 generally arranged axially between the high-pressure compressor 52 and the high-pressure turbine 54.

A mid-turbine frame 58 of the engine static structure 36 is generally arranged axially between the high-pressure turbine 54 and the low-pressure turbine 46. The mid-turbine frame 58 supports bearing systems 38 in the turbine section 28.

The inner shaft 40 and the outer shaft 50 are concentric and rotate via bearing systems 38 about the engine central longitudinal axis A, which is collinear with the longitudinal axes of the inner shaft 40 and the outer shaft 50.

In the example engine 20, the core airflow is compressed by the low-pressure compressor 44 then the high-pressure compressor 52, mixed and burned with fuel in the combustors 56, then expanded over the high-pressure turbine 54 and low-pressure turbine 46. The mid-turbine frame 58 includes airfoils 60 within the path of the core airflow. The high-pressure turbine 54 and the low-pressure turbine 46 rotatably drive the respective high-speed spool 32 and low-speed spool 30 in response to the expansion.

In some non-limiting examples, the engine 20 is a high-bypass geared aircraft engine. In a further example, the engine 20 bypass ratio is greater than about six (6:1).

The geared architecture 48 of the example engine 20 includes an epicyclic gear train, such as a planetary gear system or other gear system. The example epicyclic gear train has a gear reduction ratio of greater than about 2.3 (2.3:1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10:1), the fan diameter is significantly larger than that of the low pressure compressor 44, and the low-pressure turbine 46 has a pressure ratio that is greater than about 5 (5:1). The geared architecture 48 of this embodiment is an epicyclic gear train with a gear reduction ratio of greater than about 2.5 (2.5:1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45.

Low Corrected Fan Tip Speed is the actual fan tip speed divided by an industry standard temperature correction of Temperature divided by 518.7^0.5. The Temperature represents the ambient temperature in degrees Rankine. The Low Corrected Fan Tip Speed according to one non-limiting embodiment of the example engine 20 is less than about 1150 fps (351 m/s).

During typical operation of the engine 20, a pump 64 delivers a lubricant (e.g., oil) to the fan 42 and other areas of the engine 20, such as the geared architecture 48. When the engine 20 operates, the fan 42 rotates around the axis A in a direction $D_1$. The lubricant lubricates the fan 42, the geared architecture 48, etc.

The example pump 64 is powered by rotations of the fan 42 in the direction $D_1$. If the rotations in the direction $D_1$ are fast enough, the pump 64 delivers lubricant. Relatively low-speed rotations may not provide enough force to power the pump 64. However, these low-speed rotations do not typically require much, if any, lubricant. Windmilling rotations caused by winds that are less than 25 miles per hour (10 kilometers per hour) are considered low-speed rotations in one example.

Notably, operating the engine 20 is not required to power the pump 64. For example, the fan 42 may power the pump 64 when the fan 42 is windmilling. Windmilling, as is known, refers to rotations of the fan 42 that are not due to engine operations. In one example, the engine 20 is secured to a parked aircraft, and the engine 20 is exposed to wind. Air A represents the wind. The Air A causes the fan 42 to windmill.

Rotations of the fan 42 in a direction $D_2$, which is opposite the direction $D_1$, do not cause the pump 64 to deliver lubricant. In one example, rotation in the direction $D_2$ does not cause the pump 64 to deliver lubricant because rotation in the direction $D_2$ runs the pump 64 in a reverse direction.

Unlubricated rotations can damage the fan 42, the geared architecture 48, etc., especially if these rotations are high-speed rotations. Accordingly, the example engine 20 includes a clutch assembly 68 that limits rotation of the fan 42 in the direction $D_2$.

Figure 2A:
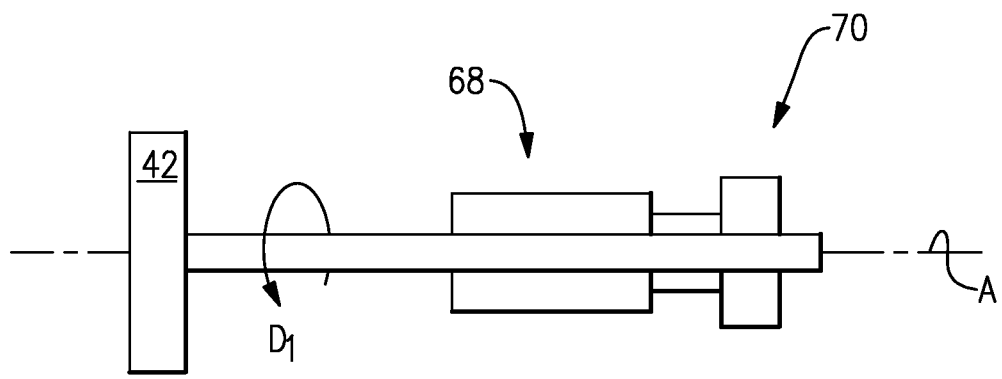
FIG. 2A shows a schematic view of a clutch assembly of the FIG. 1 turbomachine in a first position.
Figure 2B:
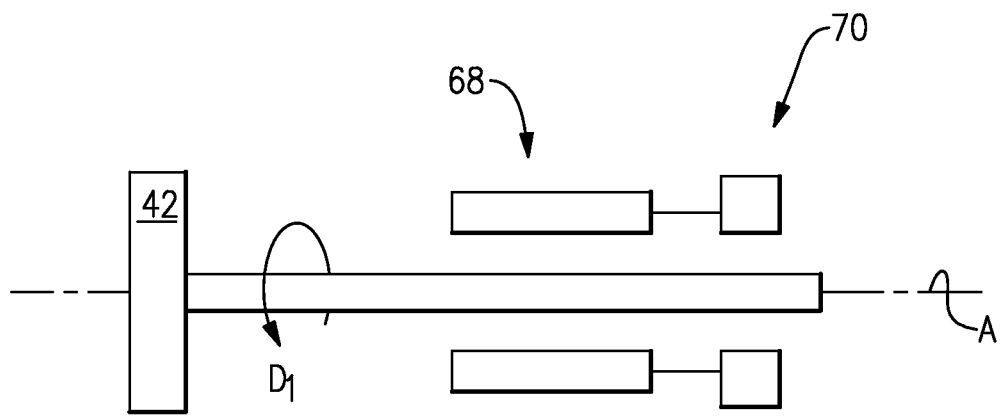
FIG. 2B shows the FIG. 2A clutch in a second position.

Referring now to FIGS. 2A-2B, the example clutch assembly 68 moves between a first position and a second position. The clutch assembly 68 is in the first position when the fan 42 is not rotating, or when the fan 42 is rotating at a rotational speed less than a threshold speed. In the first position, the clutch assembly 68 blocks rotation of the fan 42 in the direction $D_2$. The clutch assembly 68 thus ensures any windmilling rotations of the fan 42 are in a direction suitable for powering the pump 64. The clutch assembly 68 moves to the second position when the fan 42 rotates at speeds above the threshold speed.

In one example, the threshold speed corresponds to rotations of the fan 42 when wind moves at 25 miles per hour (40 kilometers per hour) through the engine fan section 22. A rotational speed of the fan 42 exceed the threshold speed when the speed of the wind though the fan section 22 is greater than 25 miles per hour (40 kilometers per hour).

In the second position, the clutch assembly 68 is disengaged. The clutch assembly 68 offers very little resistance to rotation when the clutch assembly 68 is in the second position. Because there is very little resistance, the clutch assembly 68 is not significantly worn when the clutch assembly 68 is in the second position, which increases the useful life of the clutch assembly 68.

As can be appreciated, rotations of the fan 42 above the threshold speed are always in the direction $D_1$. The threshold speed is typically set below an idle speed of the engine 20 to ensure that the clutch assembly 68 is always in the second position when the engine 20 is idling.

An actuation assembly 70 controls movement of the clutch assembly 68 between the first position and the second position. The example actuation assembly 70 (and the clutch assembly 68) are mechanical devices. That is no wiring or electrical signals are required to move the clutch assembly 68 between the first position and the second position. That is, the actuation assembly 70 is driven exclusively by centrifugal force and the mechanical action of levers and springs. No outside energy source, such as electrical or hydraulic motors, are required to actuate the mechanism other than mechanical rotation of the fan 42. In some other examples, the actuation assembly, the clutch assembly, or both, may incorporate non-mechanical devices.

Many types of clutches are suitable for use in the clutch assembly 68. FIGS. 3A-4B show an example ramp/roller clutch 78 for use in the clutch assembly 68 of FIGS. 2A-2B. The clutch 78 includes many features of the clutch described in U.S. Pat. No. 4,531,620, the contents of which are incorporated herein by reference.

Figure 3A:
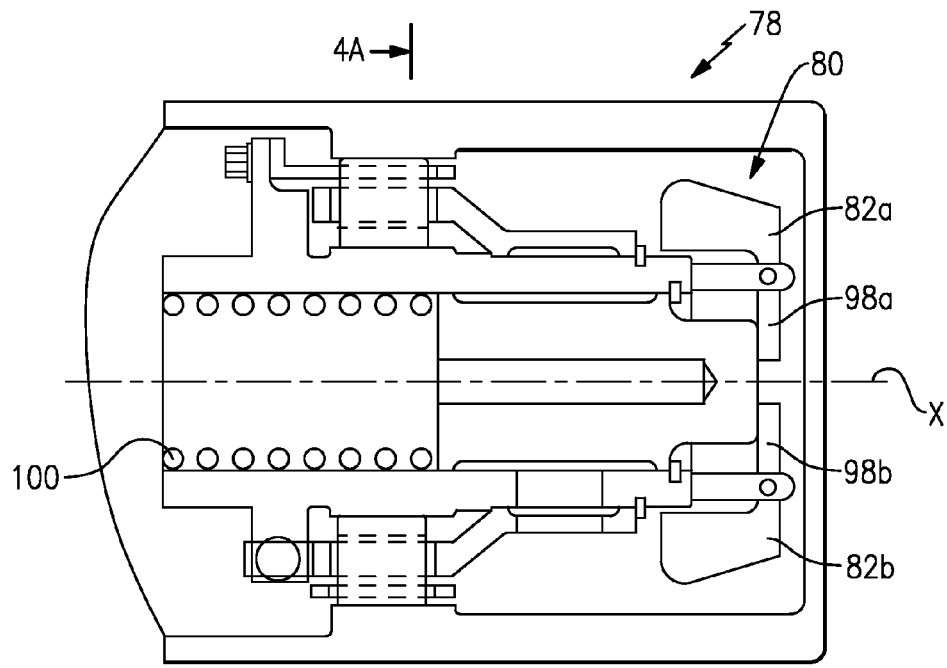
FIG. 3A shows an axial section view of an example turbomachine clutch in a first position.
Figure 3B:
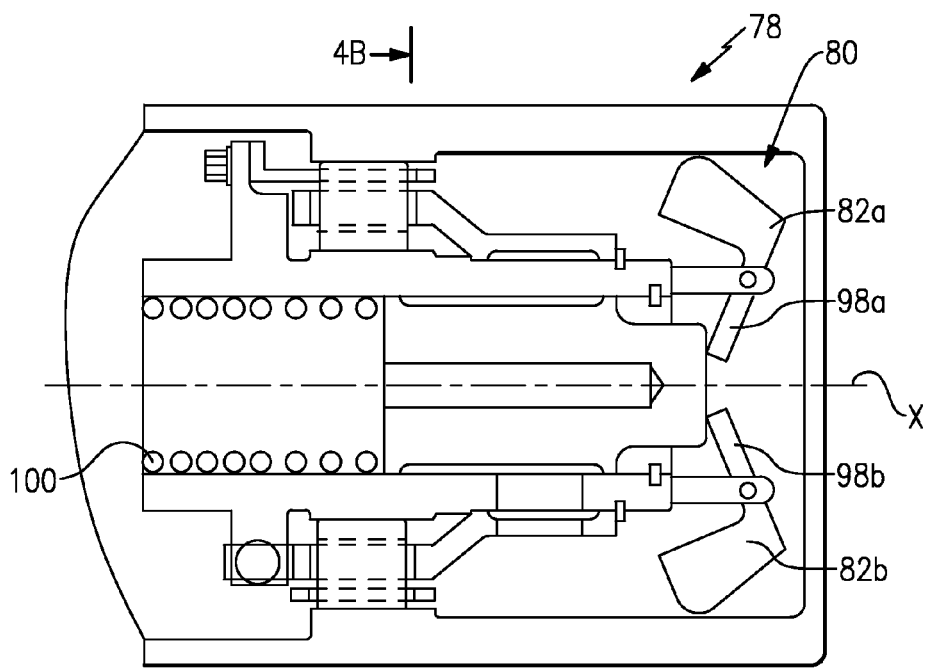
FIG. 3B shows the FIG. 3A turbomachine clutch in a second position.
Figure 4A:
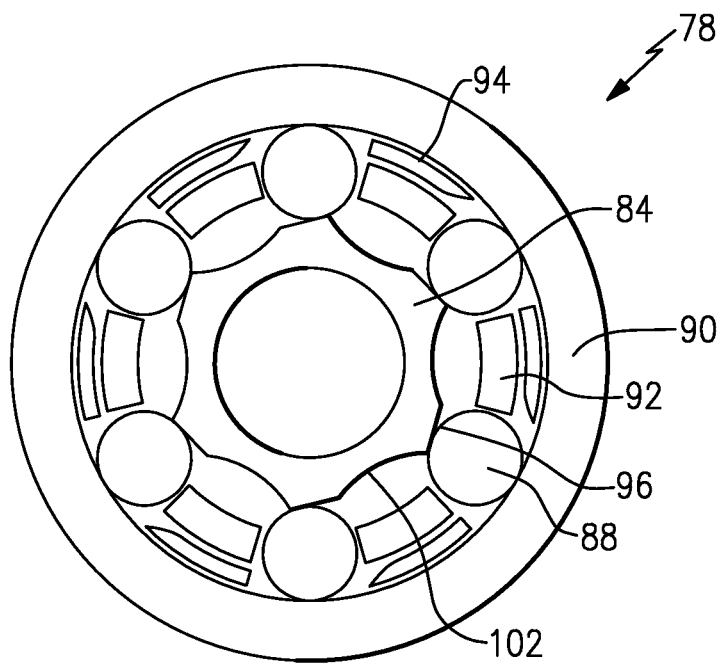
FIG. 4A shows a section view at line 4A-4A in FIG. 3A.
Figure 4B:
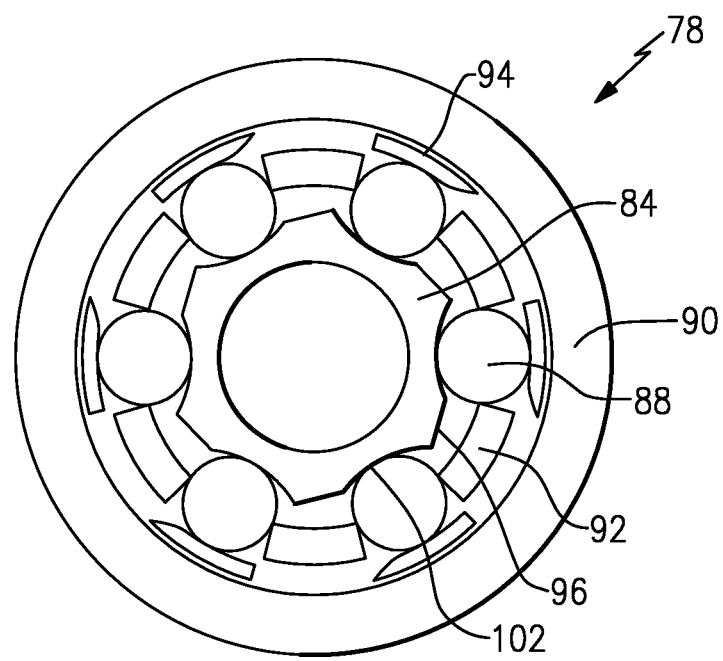
FIG. 4B shows a section view at line 4B-4B in FIG. 3B.

The clutch 78 is shown in the first position in FIGS. 3A and 4A. The clutch 78 is shown in the second position in FIGS. 3B and 4B.

In this example, an actuator 80 includes a pair of centrifugal weights 82a and 82b that rotate with portions of the clutch 78 around an axis X. The weights 82a and 82b rotate together with the fan 42. The weights 82a and 82b are biased radially inward to a position that holds the clutch 78 in the first position.

When the fan 42 rotates in the direction $D_1$ faster than the threshold speed, the centrifugal force on the weights 82a and 82b exceeds the biasing force and the weights 82a and 82b are cast radially outward away from the axis X. As will be explained in more detail, this radial movement of the weights 82a and 82b causes the clutch 78 to move from the first position to the second position.

When the rotation of the fan 42 no longer exceeds the threshold speed, the weights 82a and 82b move back toward the axis X, which moves the clutch 78 back to the first position.

The clutch 78 includes a shaft 84 that is coupled in rotation together with the fan 42. When the clutch 78 is in the first position, rollers 88 contact a housing 90. When the clutch 78 is in the first position, the rollers 88, an inner cage 92 and an outer cage 94 rotate together relative to the housing 90 in a clockwise direction. In this example, the housing 90 is mounted to a fixed bearing support or an engine static structure. In this example, the shaft 84 is an inner shaft, and the housing 90 is an outer cylindrical shaft.

Rotating the fan 42 and the shaft 84 in the counter-clockwise direction causes the rollers 88 to bind between ramped surfaces 96 of the shaft 84 and the cylindrical housing 90. Thus, when the clutch 78 is in the first position, the fan 42 is only rotatable in one direction.

When the rotations of the first shaft 84 in a clockwise direction exceed the threshold speed, the weights 82a and 82b are thrown radially outward due to centrifugal force. The radial movement of the weights 82a and 82b pivots arms 98a and 98b, respectively. The arms 98a and 98b move the inner cage 92 axially against a biasing force provided by a spring 100. The inner cage 92 rotates with respect to the shaft 84 when moved axially, which permits the rollers 88 to move circumferentially relative to the shaft 84 and move into recessed areas 102. When the rollers 88 are in the recessed areas 102, the rollers 88 are radially spaced from the housing 90. A circumferential spring (not shown) may encourage this movement.

Relative rotation of the inner cage 92 thus permits the rollers 88 to disengage from the housing 90 and move radially inward to a position within an outer cage 94. The clutch 78 is then considered to have moved to the second position.

Again, in the second position, the rollers 88 are radially spaced from the housing 90. The outer cage 94 is also radially spaced from the housing 90. The resulting clearance between the housing 90 and these portions of the clutch 78 enables the shaft 84 to freely rotate with little, if any, resistance from the rollers 88, or other portions of the clutch 78. Since none of these parts contact each other, little, if any, wear occurs when the clutch 78 is in the second position. When the rotational speed of the shaft 84 decreases, the circumferential force holding the weights 82a and 82b decreases. The spring 100 is then able to move the inner cage 92 back to a position that holds the rollers 88 radially against the housing 90, i.e., the first position.

Features of the disclosed examples include a clutch experiencing very little wear at rotational speeds above a threshold speed.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A turbomachine clutch assembly, comprising:
   a clutch that moves from a first position to a second position in response to rotation of a turbomachine fan at a speed greater than a threshold speed, wherein
   the clutch permits rotation of the turbomachine fan in a first direction whether the clutch is in the first position or the second position, and
   the clutch limits rotation of the turbomachine fan in an opposite, second direction when the clutch is in the first position, wherein the clutch is a ramp/roller clutch.

2. The turbomachine clutch assembly of claim 1, wherein the turbomachine fan is a ducted fan received within a duct and is rotatable relative to the duct.

3. The turbomachine clutch assembly of claim 1, wherein the threshold speed is less than an idling speed.

4. The turbomachine clutch assembly of claim 1, wherein the threshold speed is a threshold rotational speed of the fan.

5. The turbomachine clutch assembly of claim 1, wherein the clutch is an entirely mechanical clutch.

6. The turbomachine clutch assembly of claim 1, wherein the clutch moves from the second position to the first position in response to rotation of a turbomachine fan no longer exceeding the threshold speed.

7. The turbomachine clutch assembly of claim 1, including a lubrication pump that lubricates the turbomachine fan, the lubrication pump powered by the turbomachine fan rotating in the first direction.

8. The turbomachine clutch assembly of claim 1, wherein the clutch permits rotation of the turbomachine fan in the second direction when the clutch is in the second position.

9. The turbomachine clutch assembly of claim 1, wherein the turbomachine fan is in a turbomachine that rotates the turbomachine fan in the first direction during operation.

10. A mechanical clutch assembly for a turbomachine, comprising:
a fan; and
a clutch moveable between a second position that permits windmilling rotations of the fan in a first direction and a second direction opposite the first direction, and a first position that limits windmilling rotation of the fan in the first direction and permits windmilling rotation of the fan in the second direction, wherein the clutch is a mechanical ramp/roller clutch.

11. The mechanical clutch assembly of claim 10, wherein clutch includes a weight that changes positions in response to centrifugal force, the weight moving the clutch from the second position to the first position when the weight changes positions.

12. The mechanical clutch assembly of claim 11, wherein the weight is biased toward positioning the clutch in the second position.

13. The mechanical clutch assembly of claim 12, including a spring that biases the weight.

14. The mechanical clutch assembly of claim 11, wherein the weight changing positions initiates radial movement of rollers in the clutch.

15. A method of controlling rotation of a turbomachine fan, including:
engaging a clutch to prevent rotation of a turbomachine fan in a first direction about an axis when a rotational speed of the turbomachine fan about the axis is below a threshold speed; and
disengaging the clutch when the rotational speed of the turbomachine fan about the axis meets or exceeds the threshold speed, wherein the clutch is a ramp/roller clutch.

16. The method of claim 15, wherein the engaging and disengaging is entirely mechanical.

17. The method of claim 15, including using centrifugal weights to control the engaging and the disengaging.

18. The turbomachine clutch assembly of claim 1, wherein the clutch is moveable from the first position to the second position in response to a windmilling rotation of the turbomachine fan at a speed greater than a threshold speed, the windmilling rotation independent from rotations caused by operation of a turbomachine having the turbomachine fan.

19. The turbomachine clutch assembly of claim 10, wherein the fan is received within a duct and comprises blades that are rotatable relative to the duct.

20. The method of claim 15, wherein the rotation of the turbomachine fan is a windmilling rotation of the turbomachine fan independent from rotations induced by operation of a turbomachine having the turbomachine fan.

21. The method of claim 15, wherein rotation of the turbomachine fan causes the disengaging.

* * * * *